Figure 1:
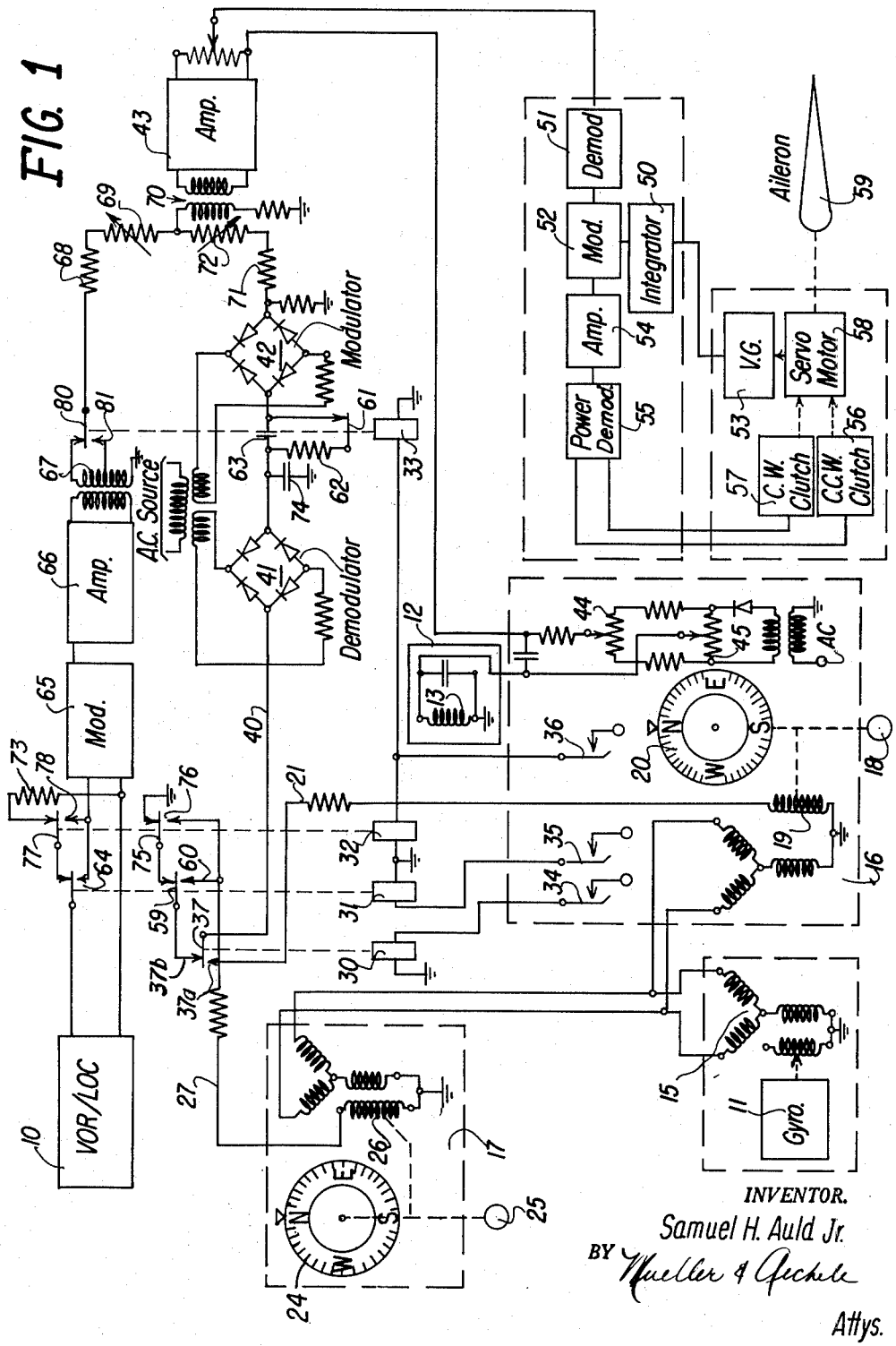

INVENTOR.
Samuel H. Auld Jr.
BY Mueller & Aichele
Attys.

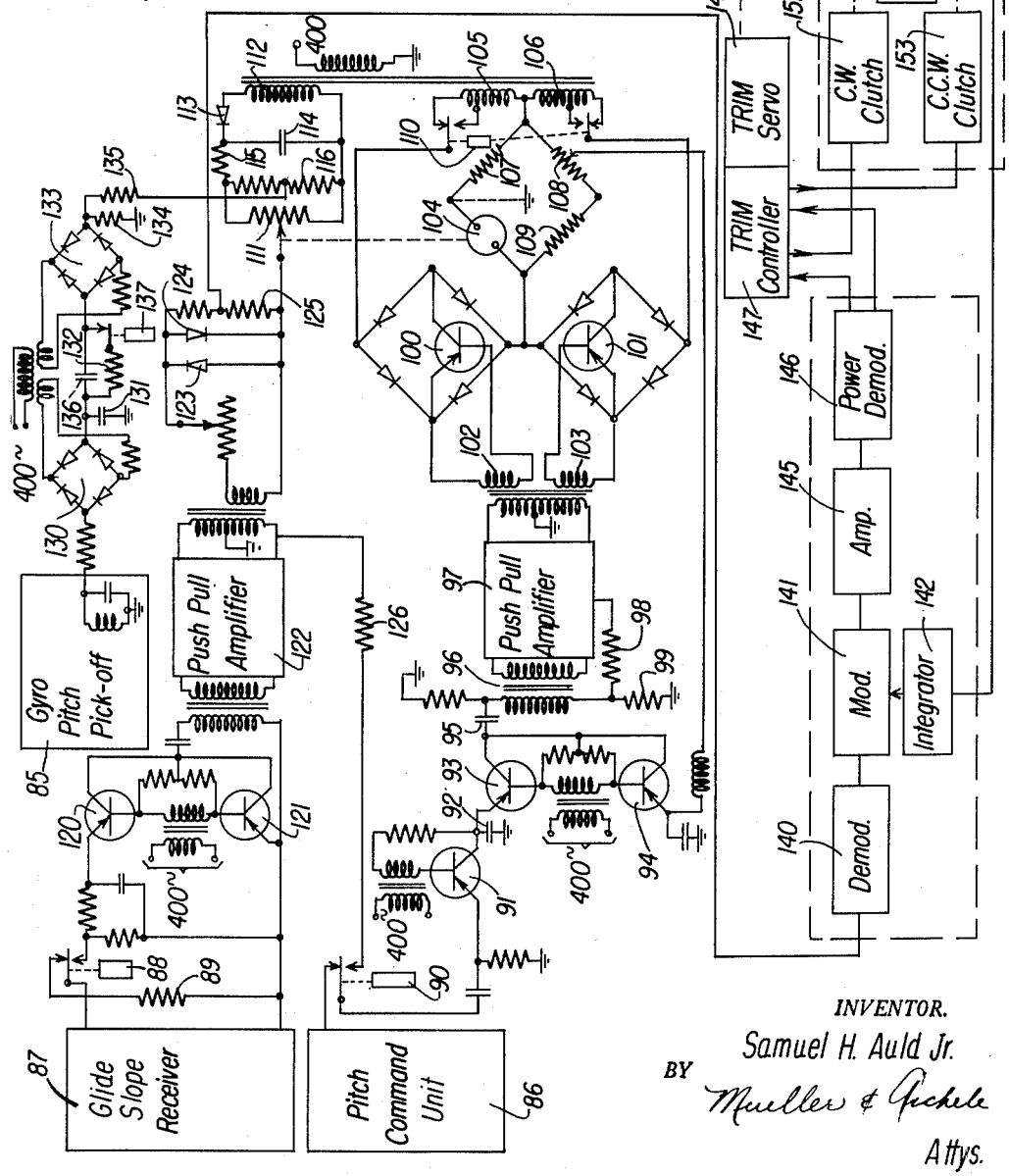

United States Patent Office 3,144,221
Patented Aug. 11, 1964

3,144,221
AIRCRAFT CONTROL SYSTEM
Samuel H. Auld, Jr., Woodland Hills, Calif., assignor, by mesne assignments, to The Bendix Corporation, Baltimore, Md., a corporation of Maryland
Filed Mar. 6, 1961, Ser. No. 93,503
10 Claims. (Cl. 244—77)

This invention relates generally to autopilot systems for aircraft, and more particularly to a system for controlling the approach of an airplane in response to radio signals and signals from a gyro, and which compensates for deviations of the aircraft from its course.

In providing an automatic pilot system for aircraft use, consideration must be given to the control of the aircraft under all conditions. Gyros are provided on the craft to produce signals which indicate the deviation of the craft from a particular heading or attitude which has been set, and these signals are used to control the craft to bring it on the set heading or attitude. Radio equipment is also provided, particularly for use in connection with landing, to bring the aircraft onto a predetermined course. In providing such landings, signals from the radio equipment and from the gyro equipment are used in combination, with the radio signals bringing the craft in on course, and the signals from the gyro equipment adding stability. The signals from the gyro, of course, indicate the actual position of the craft, and in the event that the aircraft is proceeding down the desired path or track, the signals from the gyro and from the radio equipment will normally coincide and cooperate to control the landing.

Under some conditions it is necessary that the actual direction of the aircraft must differ from the direction which has been set in order to bring the aircraft to the course identified by the radio signals. For example, in the event that the aircraft is landing in the presence of a cross wind, it may be necessary that the actual heading of the aircraft vary from the heading set to correspond to the desired path of movement, in order to counteract the effect of the wind. In such case the gyro will indicate that the aircraft is off its proper heading and will tend to change the direction of movement to thereby produce a wrong direction. A similar condition may exist in the pitch axis when the aircraft approaches the glide slope beam from below. In such case the glide slope signal directs the aircraft to climb, and the pitch gyro commands the aircraft to nose down.

It is therefore an object of the present invention to provide an automatic pilot system for an aircraft, which compensates for the change in direction required because of a particular condition.

A further object of the invention is to provide an autopilot system wherein landing is controlled by signals from radio equipment on the craft and from gyro equipment on the craft, and wherein the signals from the gyro equipment are modified to compensate for long-duration conditions which require a change in the actual direction of the craft.

Another object of the invention is to provide an automatic pilot system which compensates for the change in heading required because the aircraft is landing in a cross wind.

Still another object of the invention is to provide an automatic pilot system which compensates for the change in pitch required to bring the aircraft to the glide slope path and to maintain the aircraft in the exact center of the glide slope path.

A feature of the invention is the provision of an automatic pilot system for aircraft including direction control equipment responsive to gyro equipment on the aircraft and radio equipment responsive to a radio beam, with compensating means selectively connected in the system to modify the signal from the gyro equipment to compensate for outside effects during landing of the aircraft. This may be utilized to compensate the heading control for a cross wind, and/or to compensate the pitch control to maintain the aircraft in the exact center of the glide slope path.

Another feature of the invention is the provision of an aircraft control system for controlling the landing of an aircraft including a first radio channel for providing a signal in response to a radio beam, and a second channel controlled by a gyro, and wherein the system converts the gyro signal to a direct current which is applied to the controlling means through a capacitor which charges to compensate for a change in direction required to compensate for an outside effect. The charge on the capacitor does not follow rapid changes in direction so that such changes vary the direct current from the gyro to stabilize the control of the aircraft. The capacitor is selectively bridged to control its effectiveness.

Figure 2:
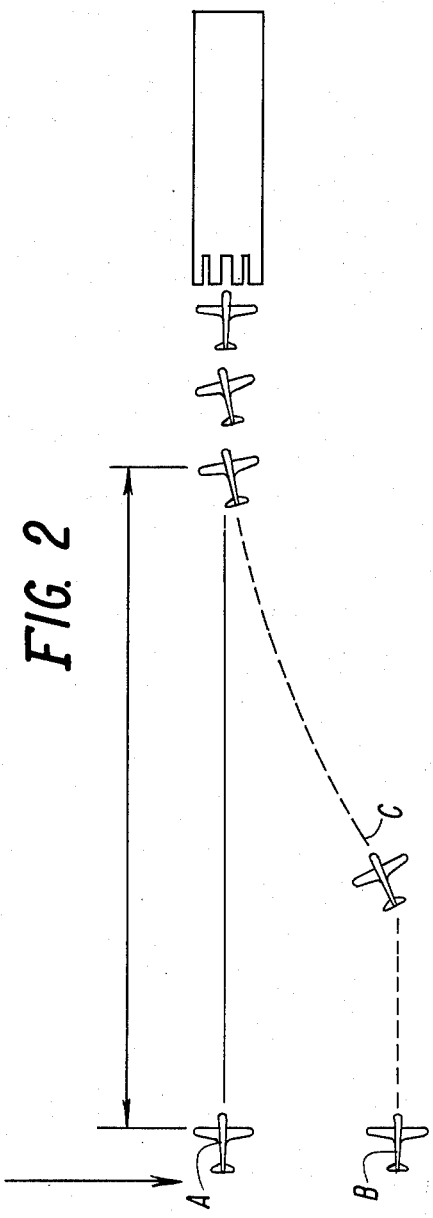
Figure 4:
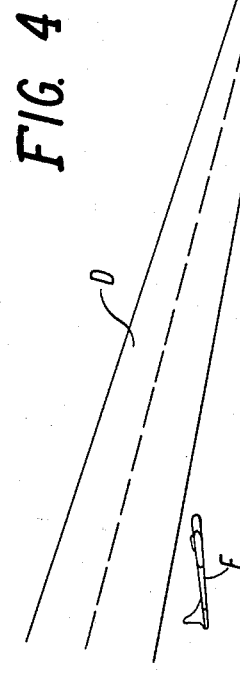

The invention is illustrated in the drawings wherein:
FIG. 1 is a schematic diagram of the autopilot system of the invention for providing cross wind compensation;
FIG. 2 illustrates the operation of the system of FIG. 1 in an instrument landing;
FIG. 3 is a schematic diagram of the automatic pilot system with pitch compensation; and
FIG. 4 illustrates the operation of the system of FIG. 3.

In practicing the invention there is provided an automatic pilot system for controlling an aircraft, and particularly for bringing the aircraft in on the right path during landing. The system of the invention may be used to correct the heading for the effect of a cross wind, and/or may be used to compensate the pitch control to allow the aircraft to follow the exact center of the glide slope path regardless of the attitude required to so so. The system includes a first channel controlled by radio signals derived from a radio beam, and a second channel for signals derived from a gyro. For cross wind compensation, the first channel may respond to either an omni range beam (VOR) or a localizer beam (LOC). The second channel derives heading signals from a gyro which may be adjusted by a first control to set a desired heading for general flight, and by a second control to provide the heading for landing. The gyro control signals are applied to a demodulator to produce a direct current signal, and direct current signals from both channels are applied to modulators the outputs of which are added to produce a composite control signal. This is combined with other control signals to operate a servo which positions the ailerons of the aircraft to control the roll thereof and to in turn control the heading of the aircraft. In the presence of a strong wind, in order for the craft to move along its desired path or track, the heading of the craft will have to differ from the actual direction of the path to compensate for the wind. To eliminate the need for control by the pilot, or by separate control means, the direct current signal in the second channel is applied through a "washout" capacitor which will slowly charge to cancel out any signal produced because of the angular position of the aircraft which continues for a predetermined time. This will compensate for the effect of a steady cross wind. Relays are provided to control the system by selectively applying signals from the radio equipment and the heading control units to the two channels, and to bridge the capacitor to remove the effect thereof.

The same general system may be used in the pitch channel to permit the aircraft to deviate from the set attitude and take the attitude required to follow the exact center of the glide slope path. For example, when the aircraft approaches the glide slope path from below the beam, the glide slope signals call for the aircraft to climb, and the gyro signals call for the aircraft to nose down. By use of the "washout" capacitor in the gyro channel, the long duration signal from the gyro is cancelled out and the aircraft is controlled by the radio signals, with the system responding to short duration signals from the gyro to stabilize the system.

Referring now to the drawings, the VOR/LOC unit 10 includes radio equipment for providing a signal indicating the position of the craft with respect to a radio beam. A direction gyro 11 provides output signals indicating the direction of the craft with respect to the true direction which may be derived from a magnetic compass. A vertical gyro 12 is also provided which indicates the position of the aircraft about the roll axis. This gyro may also indicate the position of the aircraft with respect to the pitch axis. Heading signals are derived from the heading transmitter 15 of the directional gyro and applied to control units 16 and 17. The control unit 16 may provide a plurality of different controls and includes a heading control knob 18 for controlling the signal in the pickoff winding of control transformer 19. A dial 20 indicates the position selected by the control knob 18. The signal from the control transformer 19 is applied through conductor 21 to the heading control channel as will be further explained.

The control unit 17 also includes a control knob 25 which controls the signal in the pickoff winding of control transformer 26. The dial 24 indicates the direction selected. The output signal is applied through conductor 27 to the heading channel.

The heading channel of the automatic pilot system is controlled by a plurality of relays 30, 31, 32 and 33 which are actuated by switches 34, 35 and 36 in the control unit 16. The relays 32 and 33 operate at the same time and are controlled by the same switch 36. Relay 30 when operated causes the movable contact 37 thereof to engage the fixed contact 37a so that the signal from conductor 21 is applied to conductor 40 of the heading channel. This is the condition for normal flight, with the heading signal being applied through demodulator 41 and modulator 42 to the amplifier 43. This provides a lateral control signal which is combined with a signal from turn potentiometer 44 and roll trim potentiometer 45 of control unit 16, and a roll signal produced by the roll take-off 13 coupled to the vertical gyro 12. A.C. and D.C. signals are combined in this series circuit to provide a composite control signal. This signal is applied to demodulator 51 which converts the same to a direct current signal, and to modulator 52 wherein the signal is combined with a signal representing the position of the ailerons derived from velocity generator 53 and applied through integrator 50. The combined signal is amplified in amplifier 54 and applied to power demodulator 55. Power demodulator controls clutches 56 and 57 which in turn control servo motor 58 which positions the ailerons 59 of the aircraft. The operation of the signals from amplifier 43 and through the channel to servo motor 58 is described in my copending application Serial No. 73,107 filed December 1, 1960.

When the plane is approaching a landing, the switch 35 is closed to actuate relay 31 to cause the autopilot to perform in what is known as the capture mode. Operation of relay 31 causes the movable contact 59 thereof to engage fixed contact 60, and this applies the signal from control unit 17 through line 27 and contacts 60 and 59 to the upper contact 37b of relay 30. During such operation the relay 30 is released, so that the circuit is completed through the normally closed contacts 37 and 37b of this relay to conductor 40, as shown in the drawing. The control unit 17 which is now operative is set to provide the desired heading for the aircraft as it lands. The demodulator 41 and modulator 42 operate in the manner previously described. It is noted that relay 33 is not actuated and contacts 61 thereof are closed to bridge resistor 62 about capacitor 63 so that the capacitor is not effective.

When relays 31 and 32 are both released (as shown in the drawing), the output of the unit 10 is applied through normally closed contacts of these relays to the terminating resistor 73.

Relay 31 includes a movable contact which engages fixed contact 64 when the relay is actuated. This causes the signal from the VOR/LOC unit 10 to be applied to modulator 65 and amplifier 66. The output thereof is applied through transformer 67 and resistors 68 and 69 to transformer 70 at the input of amplifier 43. The signals from modulator 42 are applied through resistors 71 and 72 to the transformer 70 so that the signals from the two channels are now mixed, with the relative values of the two signals being controlled by variable resistors 69 and 72. The roll of the aircraft, controlled by ailerons, is thereby controlled by the two channels working together to bring the aircraft within the range of the beam along which it is guided to the landing.

When the aircraft is brought within the path of the radio beam, the tracking mode is actuated by operation of switch 36. This energizes relays 32 and 33, with relay 32 applying the signal from conductor 27 to conductor 40 through contacts 75 and 76. The circuit is completed through the normally closed contacts of relays 30 and 31. Relay 32 also includes movable contact 77 which engages fixed contact 78 thereof to apply the VOR/LOC signals to modulator 65. Relay 33 opens contact 61 so that the circuit including resistor 62 which is bridged around capacitor 63 is open. The capacitor 63 is therefore effectively in the circuit. Relay 33 also includes movable contact 80 which engages fixed contact 81 when relay 30 operates to change the connection from the full output of transformer 67 to a part thereof. This reduces the amplitude of the signal applied through the radio channel.

Assuming that the plane is making a landing along a beam at a 90° heading, as shown at A in FIG. 2, and the control 17 is set for a 90° heading, the signals from the radio channel and the heading channel will tend to hold the plane on the proper course. If the plane moves away from the beam because of the action of a cross wind as shown at B, a signal will be applied through the radio channel causing the plane to change its heading. Under such conditions, as the heading of the plane deviates from the heading which is set, a signal will be produced in the heading channel, which will try to bring the heading back. The signal in this channel should be zero as when the plane is directed at the heading which is set. This signal (voltage) will appear across capacitor 74. After a predetermined time the voltage across capacitor 74 will charge capacitor 63 so that the voltage at the output side of capacitor 63 will be zero, and no voltage will be applied to the modulator 42. Accordingly, even though the aircraft is flying at a different heading than that set on the control 17, in order to compensate for the force of a cross wind, the action of capacitor 63 compensates for this so that the voltage applied to the modulator is zero as though the aircraft was on course. This causes the aircraft to turn as shown at C in FIG. 2 and it will be brought on the radio beam.

The action described takes place only in the presence of a relatively constant, long duration, deviation from the set heading. The action of a sudden turbulence, or a sudden change in the wind will not be compensated because of the time constant of capacitor 63. In a practical system this may have a time constant of the order of thirty seconds. For example, the capacitor 74 across which the output of demodulator 41 of the heading channel is developed may have a value of 50 microfarads, capacitor 63 a value of 400 microfarads, and resistor 62 a value of 4,700 ohms. Accordingly, any force having a duration of only a few seconds will not be compensated, and the change in position of the craft will cause a change in the signal from the gyro so that a signal will be applied through modulator 42 and through amplifier 43 to the servo to change the position of the ailerons to compensate for such force.

It is to be pointed out that relay contacts 61 bridge resistor 62 about capacitor 63 so that the capacitor can be effectively shorted out and have no effect. This is the condition during normal flight and in making an approach to an instrument landing. However, when the beam is captured and the aircraft is controlled thereby in the track mode of the system, relay 33 is energized to open contacts 61 so that capacitor 63 is effectively in the circuit. Under such conditions the capacitor compensates for long duration deviations of the heading of the craft from the heading which is set, but permits control through the aircraft controls in response to sudden changes in heading.

The application of the invention to the pitch channel of an automatic pilot system is shown in FIG. 3. The pitch channel is controlled by the pitch pickoff 85 of the gyro, by controls from the pitch command unit 86, and by signals from the glide slope receiver 87. During normal flight, the relay 88 is released so that the glide slope receiver output is connected to resistor 89 which forms a terminating load. The signals from the glide slope receiver are therefore not utilized in the automatic pilot system under such conditions.

During normal flight, the automatic pilot system is controlled by signals from the pitch command unit 86 which are applied through contacts of relay 90 (not operated) to the demodulator including transistor 91. This produces a direct current voltage across capacitor 92. The voltage across capacitor 92 is applied to a modulator including transistors 93 and 94 which provide an alternating current output applied through capacitor 95 to transformer 96 which is connected to the input of push-pull amplifier 97. Negative feedback is provided through resistors 98 and 99 to increase the input impedance of the push-pull amplifier, so that capacitor 95 does not appreciably discharge capacitor 92, and the voltage of capacitor 92 remains constant for each half cycle.

The output of the push-pull amplifier 97 is applied to transistors 100 and 101 which are each connected in a bridge circuit formed by four diodes. The transformer windings 102 and 103, which apply signals from the amplifier 97 to the transistors 100 and 101, are oppositely phased so that the transistors 100 and 101 conduct during alternate half cycles. The transistors form switches for selectively connecting motor 104 to the windings 105 and 106 to which alternating current is applied. The windings 105 and 106 apply alternating current of opposite polarity to the two bridge circuits, and the diodes in the circuits are so poled that when the transistors 100 and 101 conduct on alternate half cycles, the wave applied from the windings 105 and 106 cause the motor 104 to rotate in a given direction. However, when the conduction of the transistors 100 and 101 change relative to the alternate waves from the windings 105 and 106, the motor will rotate in the opposite direction.

The motor 104 is connected in a bridge circuit including resistor devices 107, 108 and 109. Resistor device 108 is a potentiometer having a movable tap. The bridge operates from the back voltage developed by motor 104 to cause a voltage to be developed in the potentiometer which varies with the velocity of the motor 104. A portion of this voltage is fed back to the transistor 94 of the modulator to modify the effect of the voltage produced across capacitor 95. When the voltage representing the velocity of motor 104 applied through transistor 94 to capacitor 95, is equal to the voltage across capacitor 95 resulting from the voltage across capacitor 92, the output of the modulator is the same on alternate half cycles and there is no alternating current input which is applied through capacitor 95 to the push-pull amplifier 97. The motor therefore stops.

The motor 104 drives the movable arm on potentiometer 111. A direct current voltage is applied to the potentiometer 111 from the secondary winding 112 through rectifier 113 and across capacitor 114. This voltage is applied across resistors 115 and 116 which are connected in parallel with the potentiometer 111. By movement of the tap on potentiometer 111, the voltage developed between the common terminal of resistors 115 and 116 and the movable tap on potentiometer 111 may be made of different values and of either polarity. This voltage is one of the voltages which makes up the composite voltage utilized to control the pitch channel of the automatic pilot.

When the automatic pilot is placed in the glide path operating mode, the relays 88 and 90 are operated, with the relay 88 applying the signal from the glide slope receiver 87 to the balanced modulator formed by transistors 120 and 121. This produces a 400 cycle alternating current square wave voltage which is amplified in the push-pull amplifier 122. The square wave has an amplitude which varies with the signal from the glide slope receiver, and this in turn is proportional to the displacement of the aircraft above or below the glide slope beam. The output of the push-pull amplifier is applied to the output circuit including diodes 123 and 124 and across resistor 125.

The signal from the amplifier 122 is also applied through resistor 126 and through the contacts of relay 90, which is now operated, to the demodulator 91. This produces a voltage across capacitor 92 which is used to control the motor 104 to adjust the potentiometer 111 as previously described. That is, during glide path landing, the system will operate from the signal of the glide slope receiver instead of from the pitch command signal, but the manner of operation will be the same. Relay 110 is operated during glide slope operation to connect the taps on windings 105 and 106 in the motor energizing circuit. This reduces the voltage applied to the motor to reduce the speed thereof. The relay 110 may be combined with relay 90 as both operate at the same time.

The pitch channel of the automatic pilot system is also controlled from the pitch pickoff 85 of the gyro in the aircraft, as was previously mentioned. The gyro will provide an alternating current control signal which is applied to demodulator 130 which develops a direct current potential across capacitor 131. This potential is applied through resistor 132 to modulator 133 which produces an alternating current signal across resistor 134. The voltage developed across resistor 134 is coupled through resistor 135 and is applied in series with the potential difference developed according to the setting of potentiometer 111, and in series with the voltage developed across resistor 125, to make up a composite control signal. The composite signal is applied to demodulator 140. The demodulated signal is applied to modulator 141 together with a signal from integrator 142 which derives a voltage from the velocity generator 143. The output of the modulator 141 is amplified in amplifier 145 and applied to power demodulator 146.

The pitch of the aircraft is controlled both by the elevators represented as 150, and by the elevator trim tabs 151. The signal from the power demodulator which indicates the change in pitch desired is applied to the trim controller 147 which operates a servo 148 to move the elevator trim tabs 151. The signal from the trim controller is also applied to the clutches 152 and 153 which operate servo motor 154 controlling the elevators proper 150. The velocity generator 143 is coupled to the servo motor and provides an output which is integrated and applied to modulator 141. The operation of this system is generally the same as that of the control system of FIG. 1 and as described in my copending application Serial No. 73,107 referred to above.

It is seen from the above that when the relays 88 and 90 are operated, the pitch control of the aircraft is provided by the pitch takeoff from the gyro and by the output of the glide slope receiver. There are certain instances however in which the control signals from these two controlling devices tend to produce opposite operation, and this may result in improper control of the aircraft. FIG. 4 illustrates the position of the glide slope beam D directed from a runway E. When the aircraft is at position F as shown, the signal from the glide slope receiver will tend to cause the aircraft to climb to a position corresponding to the center line of the glide slope path. However, when the plane is in the landing condition the signal from the gyro will tend to cause the craft to nose down for landing. In order that the signtl from the gyro will not interfere with the signal from the glide slope receiver, relay 137 may be operated to open the circuit through resistor 132 which shunts capacitor 136. Accordingly, capacitor 136 will be in the circuit and will charge up from the voltage across capacitor 131. When capacitor 136 charges to the full voltage across capacitor 131, no voltage will be applied to the modulator 133. There can, therefore, be no voltage across resistor 134, so that the composite control voltage will not be affected by the gyro signal.

The effect of the gyro will still be present as to rapid fluctuations in pitch caused by turbulence or the like. This is because capacitor 136 cannot charge rapidly and any signals from the gyro resulting from sudden changes in pitch in the aircraft will appear across capacitor 131, and will be passed through capacitor 136 and developed across resistor 134. These signals will therefore appear in the composite signal applied to demodulator 140 to provide a stabilizing action through the pitch control channel of the automatic pilot.

The system of the present invention therefore operates to remove the effect of control signals which continue for more than a predetermined time. The system is applicable to an automatic pilot system and may be used in the heading or roll channel to "wash out" the signal from the gyro caused by the craft when in a cross wind, and/or in the pitch channel to "wash out" the action of the gyro control signal as the aircraft approaches the glide slope beam path. The system is simply accomplished solely by electrical means and is much less complex than mechanical systems for providing this action. The system has been found to be highly satisfactory to provide accurate landing of an aircraft.

I claim:

1. An automatic pilot system for an aircraft including gyro means providing a signal representing the direction of movement of the aircraft with respect to a fixed direction, said system including in combination, reference means connected to the gyro means and producing a predetermined control signal when the direction of movement of the aircraft corresponds to a particular direction, radio means responsive to a radio beam and producing a control signal which varies with the position of the aircraft with respect to the path of the beam, and control means responsive to said control signals from said reference means and from said radio means and including means for directing the movement of the aircraft, said control means including capacitor means coupled to said reference means through which said control signal from said reference means is applied, said capacitor means charging from a control signal which continues for a predetermined time to oppose said control signal from said reference means and substantially remove the effect thereof on said control means, whereby said control means directs the aircraft in acordance with said control signal from said radio means and with said control signal from said reference means which is applied through said capacitor means.

2. An automatic pilot system for an aircraft including gyro means providing a signal representing the direction of movement of the aircraft with respect to a fixed direction, said system being operative in a plurality of modes and including in combination, reference means connected to the gyro means and producing a predetermined control signal when the direction of movement of the aircraft corresponds to a particular direction, radio means responsive to a radio beam and producing a control signal which varies with the position of the aircraft with respect to the path of the beam, and control means responsive to control signals from said reference means and from said radio means and including means for directing the movement of the aircraft, said control means including capacitor means through which said control signal from said reference means is applied, relay means having a pair of contacts and resistor means connected in series with said relay contacts across said capacitor means, said relay means being operated when the pilot system is operative in one mode to open said contacts thereof so that said capacitor means charges in response to a control signal applied thereto which continues for a predetermined time, the voltage across said capacitor means opposing said control signal applied thereto to remove the effect thereof on said control means, whereby said control means directs the aircraft in accordance with said control signal from said radio means and with a control signal from said reference means which has a duration less than said predetermined time.

3. An automatic pilot system for an aircraft operative in a plurality of modes and including in combination, radio means responsive to a radio beam and producing a signal which varies with the position of the aircraft with respect to the path of the beam, gyro means providing a signal representing the direction of movement of the aircraft with respect to a fixed direction, reference means connected to said gyro means and adjustable to produce a predetermined signal when the direction of the aircraft corresponds to a particular direction, and control means responsive to said signals from said radio means and from said reference means and including means for controlling the aircraft so that it moves in the direction of the beam and the aircraft follows the path of the beam, said control means including compensating means and switch means for controlling the mode of operation of the pilot system, said switch means being connected to said compensating means for selectively rendering said compensating means operative, said compensating means being coupled to said reference means and responding to said signals from said reference means which are of long duration and which tend to direct the aircraft away from the path of the beam, said compensating means substantially removing the effect of long duration signals from said reference means to bring the aircraft to the path of the beam.

4. An automatic pilot system for an aircraft including directional gyro means providing a signal representing the heading of the aircraft with respect to a fixed direction, said system including in combination, heading means connected to the gyro means to produce a predetermined signal when the heading of the aircraft corresponds to a particular direction, radio means responsive to a radio beam and producing a signal which varies with the position of the aircraft with respect to the path of the beam, and control means responsive to said signals from said heading means and from said radio means and including means for controlling the aircraft to provide the desired heading thereof, said control means including compensating means coupled to said heading means and responsive to said signal from said heading means to remove the effect of long duration signals on said control means, whereby the effect of signals from the gyro means resulting from changes in heading required to bring the aircraft to the path of the beam are removed.

5. An automatic pilot system for an aircraft including in combination, radio means responsive to a radio beam and producing a signal which varies with the position of the aircraft with respect to the path of the beam, directional gyro means providing a signal representing the heading of the aircraft with respect to a fixed direction, heading means connected to said gyro means and adjustable to produce a predetermined signal when the heading of the aircraft corresponds to the direction of the beam, and control means responsive to said signals from said radio means and from said heading means and including means for controlling the aircraft so that the heading thereof is in the direction of the beam and the aircraft follows the path of the beam, said control means including capacitor means coupled to said heading means and responsive to a signal from said heading means which is of long duration and which tends to direct the aircraft so that it does not follow the beam, said capacitor means being charged by long duration signals to remove the effect thereof on said control means, whereby the effect of signals from said gyro means resulting from changes in heading required to bring the aircraft to the center line of the beam are removed.

6. An automatic pilot system for an aircraft operative in a plurality of modes and including in combination, radio means responsive to a radio beam and producing a signal which varies with the position of the aircraft with respect to the path of the beam, directional gyro means providing a signal representing the heading of the aircraft with respect to a fixed direction, heading means connected to said gyro means and adjustable to produce a predetermined signal when the heading of the aircraft corresponds to the direction of the beam, and control means responsive to said signals from said radio means and from said heading means and including means for controlling the aircraft so that the heading thereof is in the direction of the beam and the aircraft follows the path of the beam, said control means including compensating means and switch means for controlling the mode of operation of the system, said compensating means including capacitor means through which said signal from said heading means is applied, said capacitor means charging from signals which continue for a predetermined time to develop a voltage thereacross which opposes the control voltage, said switch means being coupled to said capacitor means and operative to selectively bridge said capacitor means, whereby the effect of signals from said gyro means resulting from changes in heading required to bring the aircraft to the center line of the beam are removed.

7. An automatic pilot system for an aircraft including in combination, directional gyro means providing a signal representing the pitch of the aircraft with respect to a fixed direction, radio means responsive to a radio beam and producing a signal which varies with the vertical position of the aircraft with respect to the path of the beam, and control means responsive to said signals from said gyro means and from said radio means and including means for controlling the aircraft to provide the desired pitch thereof, said control means coupled to said gyro means and including compensating means responsive to said pitch signal from said gyro means to remove the effect on said control means of a pitch signal which exceeds a predetermined duration, whereby the effect of signals from said gyro means resulting from changes in pitch required to bring the aircraft to the path of the radio beam are removed.

8. An automatic pilot system for an aircraft including in combination, directional gyro means providing a signal representing the pitch of the aircraft with respect to a fixed direction, radio means responsive to a radio beam and producing a signal which varies with the vertical position of the aircraft with respect to the path of the beam, and control means responsive to said signals from said gyro means and from said radio means and including means for controlling the aircraft to provide the desired pitch thereof, said control means coupled to said gyro means including capacitor means through which said pitch signal from said gyro means is applied, said capacitor means charging from said pitch signals and producing a voltage in response to signals which continue for a predetermined time to oppose said pitch signal to remove the effect thereof on said control means, so that the aircraft is controlled from said signals from said radio means and from a signal from said gyro means which continues for less than said predetermined time.

9. An automatic pilot system for an aircraft operative in a plurality of modes and including in combination, directional gyro means providing a signal representing the pitch of the aircraft with respect to a fixed direction, radio means responsive to a radio beam and producing a signal which varies with the vertical position of the aircraft with respect to the path of the beam, and control means responsive to said signals from said gyro means and from said radio means and including means for controlling the aircraft to provide the desired pitch thereof, said control means including a channel responsive to said pitch signal from said gyro means and including capacitor means and switch means operative in a predetermined mode of operation of the system for selectively bridging said capacitor means, said capacitor means charging from pitch signals which continue for a predetermined time to produce a voltage which opposes said pitch signal and remove the effect thereof on said control means, said control means operating in response to signals from said radio means to bring the aircraft to the path of the radio beam, and in response to signals from said gyro means which continue for less than the predetermined time to stabilize the movement of the aircraft.

10. An automatic pilot system for an aircraft including gyro means providing a signal representing the direction of movement of the aircraft with respect to a fixed direction, said system being operative in different modes and including in combination, reference means connected to the gyro means and producing a first control signal which represents the direction of movement of the aircraft and which has a predetermined value corresponding to a particular direction, radio means responsive to a radio beam and producing a second control signal which varies with the position of the aircraft with respect to the path of the radio beam, and control means responsive to said first and second control signals and including means for directing the movement of the aircraft in accordance with said control signals, said control means including compensating means responsive to said first control signal from said reference means and operative to remove the effect of portions of such first control signal which continue for a predetermined time, said control means including means for providing different modes of operation of the system and being operative to selectively couple said second control signal to said control means and to selectively render said compensating means operative, whereby said control means directs the aircraft in accordance with said second control signal from said radio means and in accordance with any portion of said first control signal from said reference means which has a duration less than said predetermined time.

References Cited in the file of this patent
UNITED STATES PATENTS

| | | |
|---|---|---|
| 2,985,409 | Atwood | May 23, 1961 |
| 2,987,275 | Moncrieff-Yeates | June 6, 1961 |
| 2,987,276 | Osder | June 6, 1961 |
| 2,991,029 | Callen | July 4, 1961 |
| 3,040,316 | Sather | June 19, 1962 |
| 3,043,540 | Greene | July 10, 1962 |